(12) United States Patent
Svensson (10) Patent No.: US 11,622,549 B2
(45) Date of Patent: Apr. 11, 2023

(54) MAGNETIC CASTING BRAKE

(71) Applicant: Pure Fishing, Inc., Spirit Lake, IA (US)

(72) Inventor: Patrik Svensson, Asarum (SE)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 17/383,140

(22) Filed: Jul. 22, 2021

(65) Prior Publication Data

US 2022/0022437 A1 Jan. 27, 2022

Related U.S. Application Data (60) Provisional application No. 63/055,674, filed on Jul. 23, 2020.

(51) Int. Cl.
*A01K 89/01* (2006.01)
*A01K 89/0155* (2006.01)

(52) U.S. Cl.
CPC .............................. *A01K 89/01555* (2013.01)

(58) Field of Classification Search
CPC ................................................ A01K 89/01555
See application file for complete search history.

(56) References Cited

U.S. PATENT DOCUMENTS

| | | | | |
|---|---|---|---|---|
| 4,580,742 A | * | 4/1986 | Moosberg | A01K 89/0155 242/288 |
| 4,601,439 A | * | 7/1986 | Moosberg | A01K 89/01555 242/291 |
| 4,779,814 A | * | 10/1988 | Uetsuki | A01K 89/01555 242/288 |
| 5,692,693 A | * | 12/1997 | Yamaguchi | A01K 89/01555 242/288 |
| 6,206,311 B1 | * | 3/2001 | Kim | A01K 89/01555 242/304 |
| 2005/0178869 A1 | * | 8/2005 | Hyun | A01K 89/01555 242/288 |
| 2013/0306777 A1 | * | 11/2013 | Ikebukuro | A01K 89/01555 242/288 |
| 2016/0037759 A1 | * | 2/2016 | Ikebukuro | A01K 89/01555 242/288 |
| 2016/0235048 A1 | * | 8/2016 | Ikebukuro | A01K 89/045 |
| 2017/0172131 A1 | * | 6/2017 | Toake | A01K 89/05 |

* cited by examiner

*Primary Examiner* — Emmanuel M Marcelo
(74) *Attorney, Agent, or Firm* — Husch Blackwell LLP (57) ABSTRACT

The magnetic casting brake hereof provides little magnetic brake force at the start of a cast by providing magnets on a curved cam able to rotate with the spool and move closer to the spool to achieve sufficient brake force to avoid a backlash. When the cast is finished, and one begins to retrieve the bait, the magnets rotate back to a minimum position so that retrieval will be lighter, and the feel of the lure will be increased. The casting brake will also include an off position to provide free spool.

18 Claims, 7 Drawing Sheets

MAGNETIC CASTING BRAKE

CROSS-REFERENCE TO RELATED APPLICATIONS

This Application claims priority to U.S. Provisional Patent Application Ser. No. 63/055,674, filed on Jul. 23, 2020, entitled "MAGNETIC CASTING BRAKE," the entire disclosure of which is incorporated herein by reference.

FIELD OF THE INVENTION

The invention refers to a casting brake for use in fishing reels. More particularly, it relates to a novel mechanism for adjusting the settings of a magnetic casting brake on a baitcasting reel, including adjusting its minimum and maximum settings.

BACKGROUND OF THE INVENTION

Braking systems are commonly installed on baitcasting reels to regulate the spool's rotation during a cast. Functionally, the brakes operate in a manner similar to how car brakes slow the rotation of a car's tires. As brakes are applied to the reel during casting, more resistance is provided on the spool. The purpose of the braking system on a baitcasting reel is to avoid backlash. Backlash occurs when a lure gets out in front of the line at too great of a rate and causes the line and bait to tangle. Such backlashing leads to a mess that usually takes a lot of time to untangle.

Existing braking systems uses magnets that affect the rotation of the spool, and springs to pull the magnets away from the spool in the radial direction. As a result, their ability to be adjusted is very limited.

Another braking system includes a ring that is mounted on the spool that can move back and forth between two magnetic rings. That system, however, makes the spool heavy and is counterproductive for casting distance since any added weight to the spool decreases casting distance.

SUMMARY OF THE INVENTION

The purpose of the magnetic casting brake hereof is to have low magnetic brake force at the start of a cast. This may be achieved by providing magnets on a magnet plate associated with a curved cam. The curved cam is able to rotate with the spool and move the plate (and thus the magnets) closer to the spool to achieve sufficient brake force to avoid a backlash. When the cast is finished, and an angler begins to retrieve the bait, the magnets will rotate back to a minimum position so that retrieval will be lighter, and the feel of the lure will be increased. The casting brake may also include an off position to provide free spool.

In one embodiment, the total adjustment range on the dial that adjusts the magnets associated with the curved cam is preferably 320°. The first approximately 20° transition the brake from an off position to an active position. From about 20° to 170°, the maximum position of the magnets, or how close the magnets may get to the spool, may be adjusted. At this time, the minimum position, which is substantially zero, or off, is not adjusted. Then, during the next about 150° of adjustment from 170° to 320°, the minimum position may be adjusted until the magnets have reached the maximum magnetic casting brake position, where the minimum and maximum are substantially the same.

BRIEF DESCRIPTION OF THE DRAWINGS

For a better understanding of the various embodiments of the present invention, reference may be made to the accompanying drawings in which.

While the disclosure is susceptible to various modifications and alternative forms, specific embodiments thereof are shown by way of example in the drawing and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be understood that any dimensions included in the figures are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
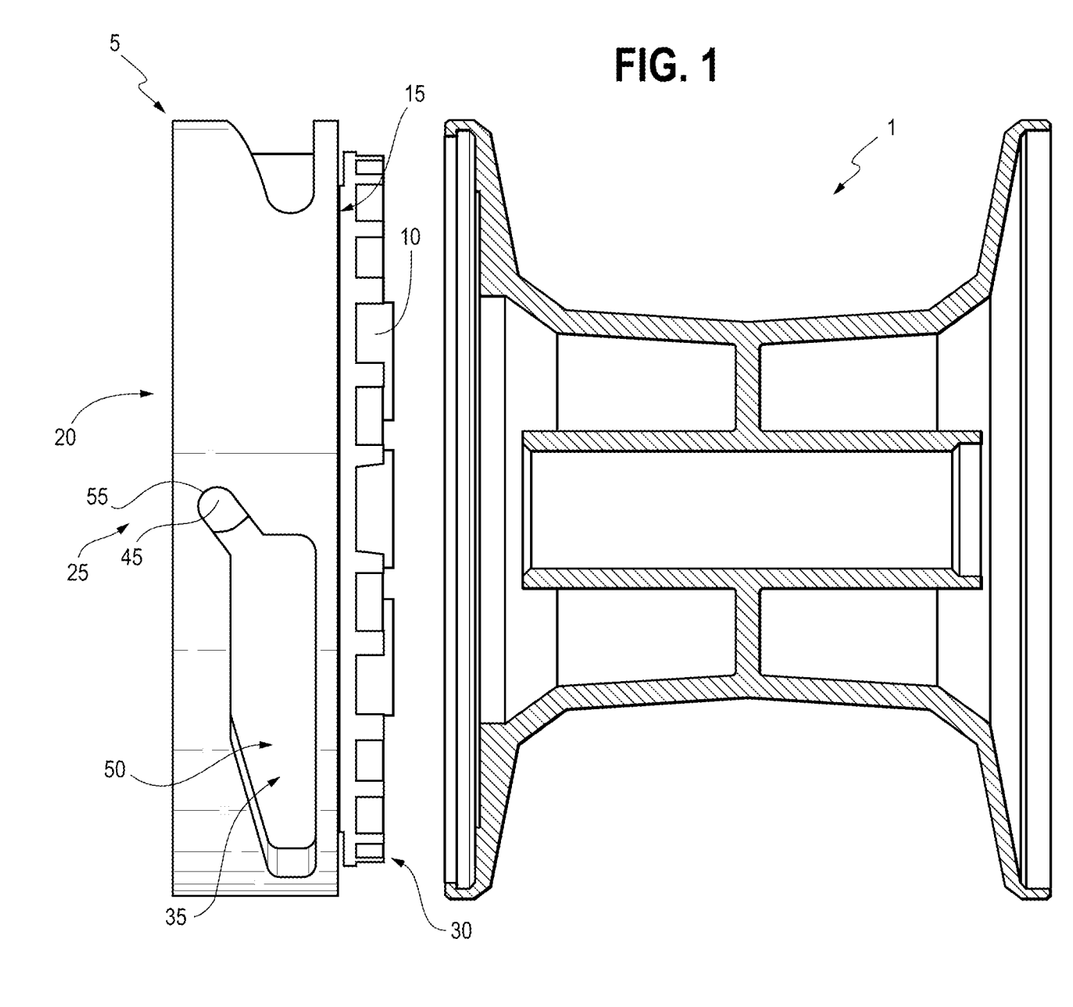
FIG. 1 illustrates a magnetic casting brake constructed according to the teachings of the present invention in a first position.
Figure 2:
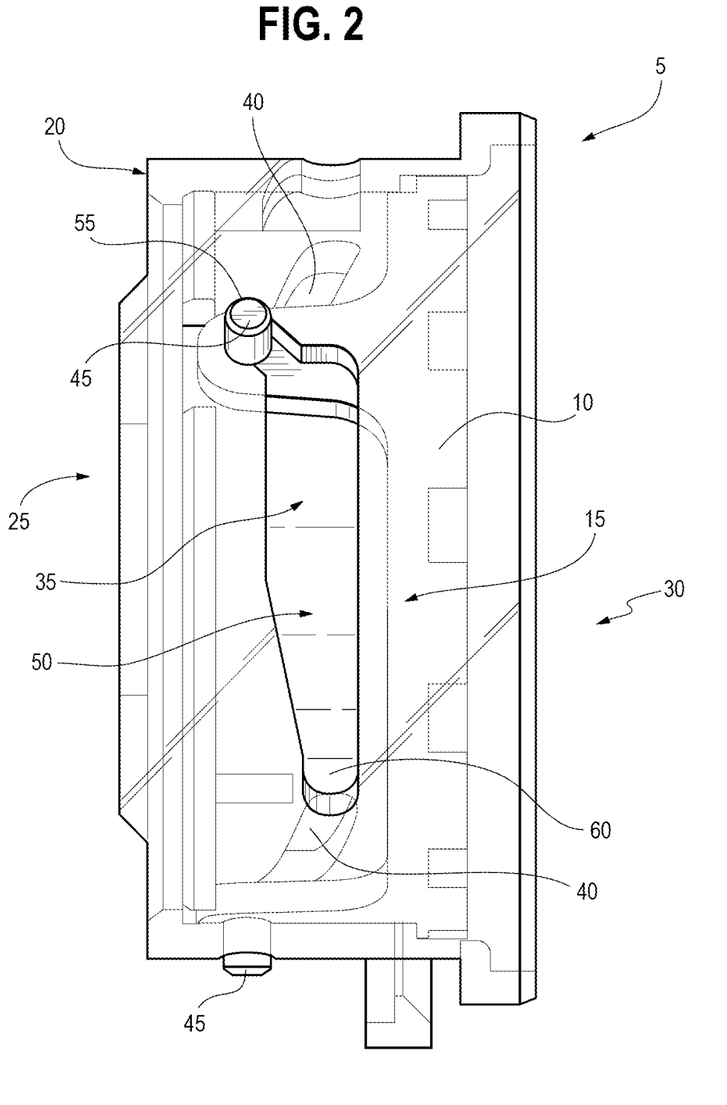
FIG. 2 illustrates the magnetic casting brake of FIG. 1 in the first position.

Turning first to FIG. 1, a spool 1 and a magnetic casting brake 5 are illustrated. In FIG. 2 (and FIGS. 3-6 described below), the magnetic casting brake 5 is illustrated without the spool 1 adjacent to it. As known and understood in the art, when the magnetic casting brake 5 is nearer the spool 1, the spool 1 and any line associated therewith is slowed down. As such, the magnetic casting brake 5 acts as a brake on the spool 1. More particularly, magnets 10 projecting toward the spool 1 create a magnetic field that acts on an electric field created by the spool 1 (which may be made from a number of materials including, but not limited to, aluminum) so as to slow down the rotational speed of the spool 1.

The magnets 10 are preferably fixably attached to a magnet plate member 15 from which the magnets 10 project toward the spool 1. The plate member 15 may be seated within a base member 20. As illustrated in FIG. 1, the magnetic casting brake 5 includes each of a distal side 25 and a proximal side 30. The proximal side 30 is preferably adjacent to spool 1 and includes the plate member 15.

Figure 2A:
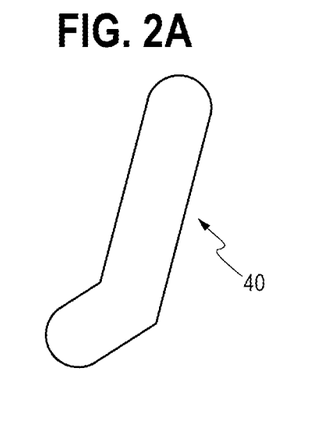
FIG. 2A illustrates a slot member of a curved cam member of the magnetic casting brake of FIGS. 1 and 2.
Figure 2B:
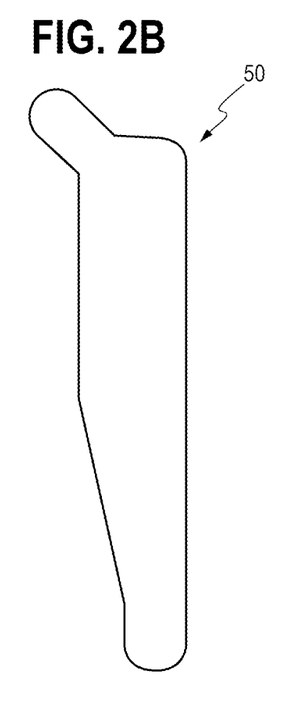
FIG. 2B illustrates an elongated opening of a base member of the magnetic casting brake of FIGS. 1 and 2.

The plate member 15 preferably includes a curved cam member 35 seated therein. As illustrated in FIG. 2, the curved cam member 35 preferably includes two slot members 40 through which pin members 45, that project radially outwardly (and inwardly) from the magnet plate member 15, may slide. The base member 20 itself also preferably includes an elongated opening 50 on each of its sides through which the pin member 45 may slide. FIGS. 2A and 2B illustrate an exemplary slot member 40 and elongated opening 50, respectively.

Figure 6:
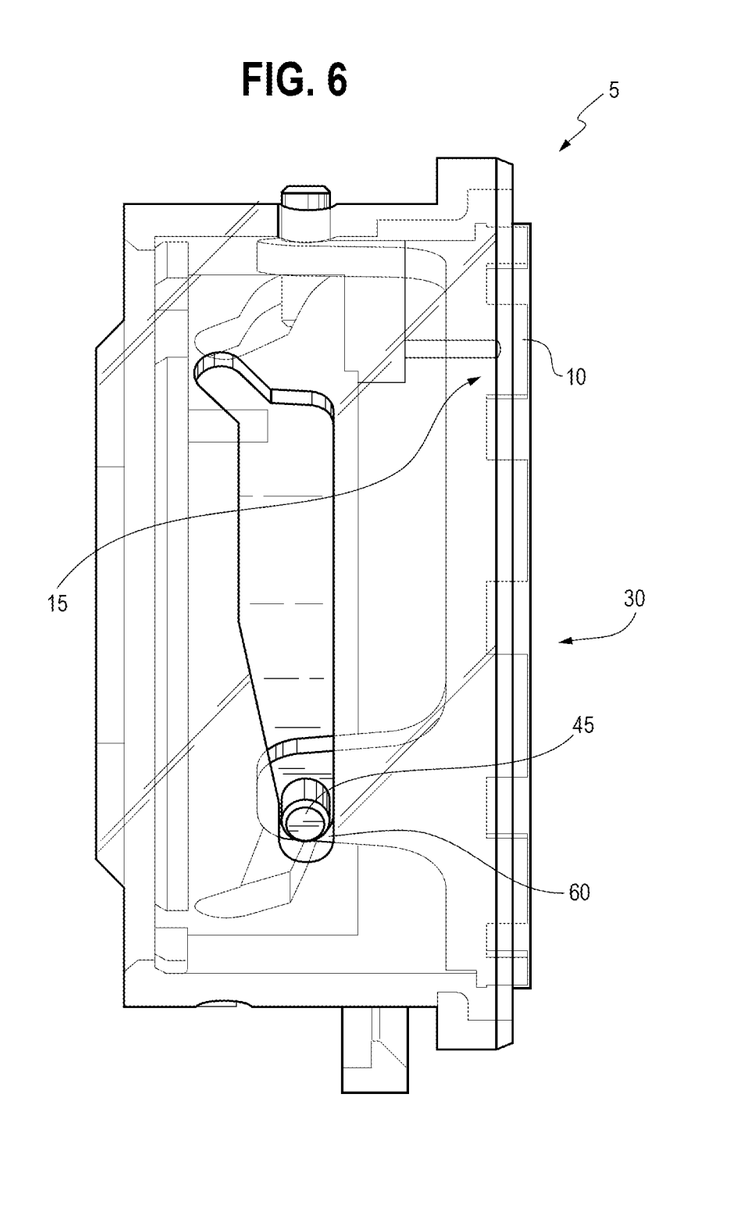
FIG. 6 illustrates the magnetic casting brake of FIGS. 1-4 in a fifth position.

As described herein, when the magnetic casting brake 5 is in its off position (and as illustrated in FIGS. 1 and 2), each pin member 45 is retained in a first end portion 55 of the elongated opening 50. Similarly, when the magnetic casting brake 5 is in its absolute maximum and minimum position, each pin member 45 of the plate member 15 is retained within a second end portion 60 (as illustrated in FIG. 6) of the base member 20.

The range of motion of a dial member (not illustrated) that controls the rotation of the curved cam member 35 is approximately 320°. As the dial member (not illustrated) is rotated, the curved cam member 35 and thus its associated slot members 40, rotate. Rotation of the slot members 40 (relative to the elongated openings 50) induces movement of the pin members 45. Rotation of the pin members 45 induces axial movement (illustrated toward the proximal side 30) of the magnet plate member 15 and thus the magnets 10.

Figure 3:
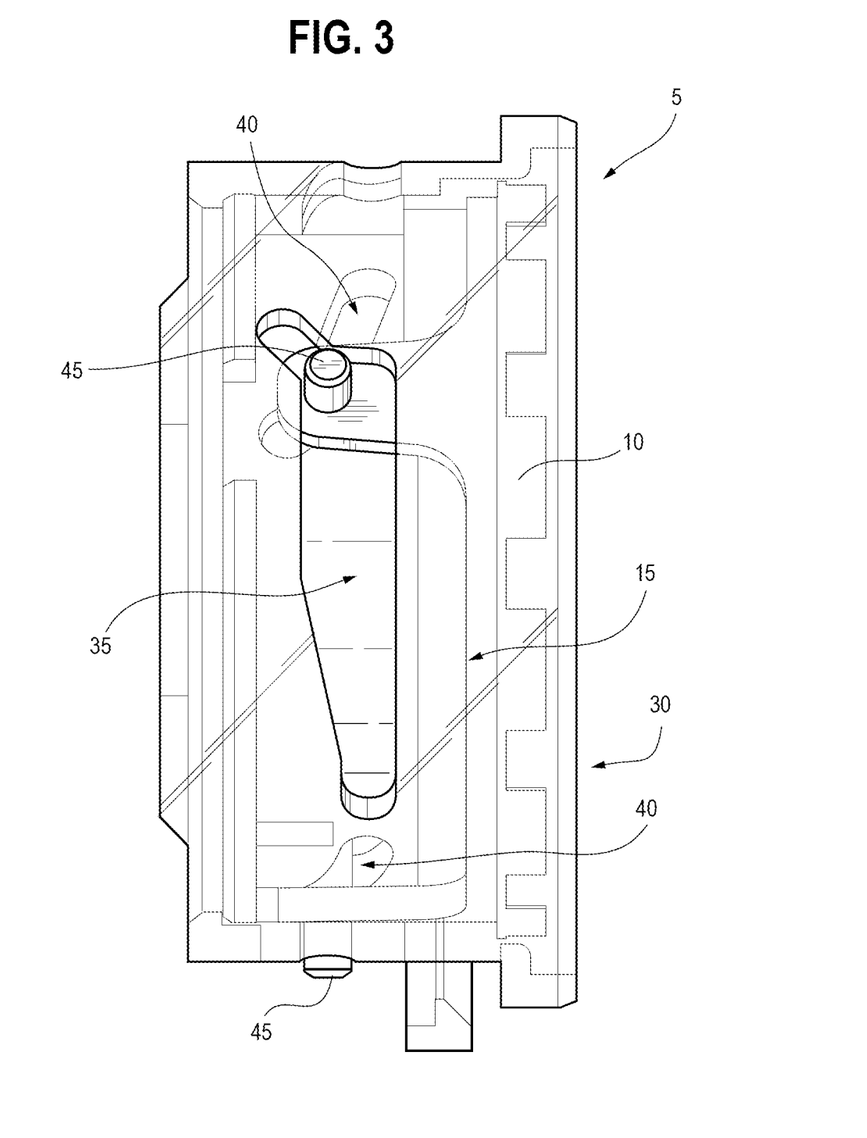
FIG. 3 illustrates the magnetic casting brake of FIGS. 1 and 2 in a second position.

In the first position illustrated in FIGS. 1 and 2, the magnetic casting brake 5 is substantially off. This position continues as the dial member is rotated and the curved cam member 35 and its associated slot members 40 cause the pin members 45 to slide toward the proximal side 30 within the slot members 40. As illustrated in FIG. 3, during the first approximately 20° by which the dial member and the curved cam member 35 are rotated, the plate member 15 and its magnets 10 are not sufficiently rotated and displaced enough toward the proximal side 30 to have an impact on the rotational speed of the spool 1. As such, in this position where the dial member has been turned within the first 20° of rotation, the spool 1 is substantially in free spool.

Figure 4:
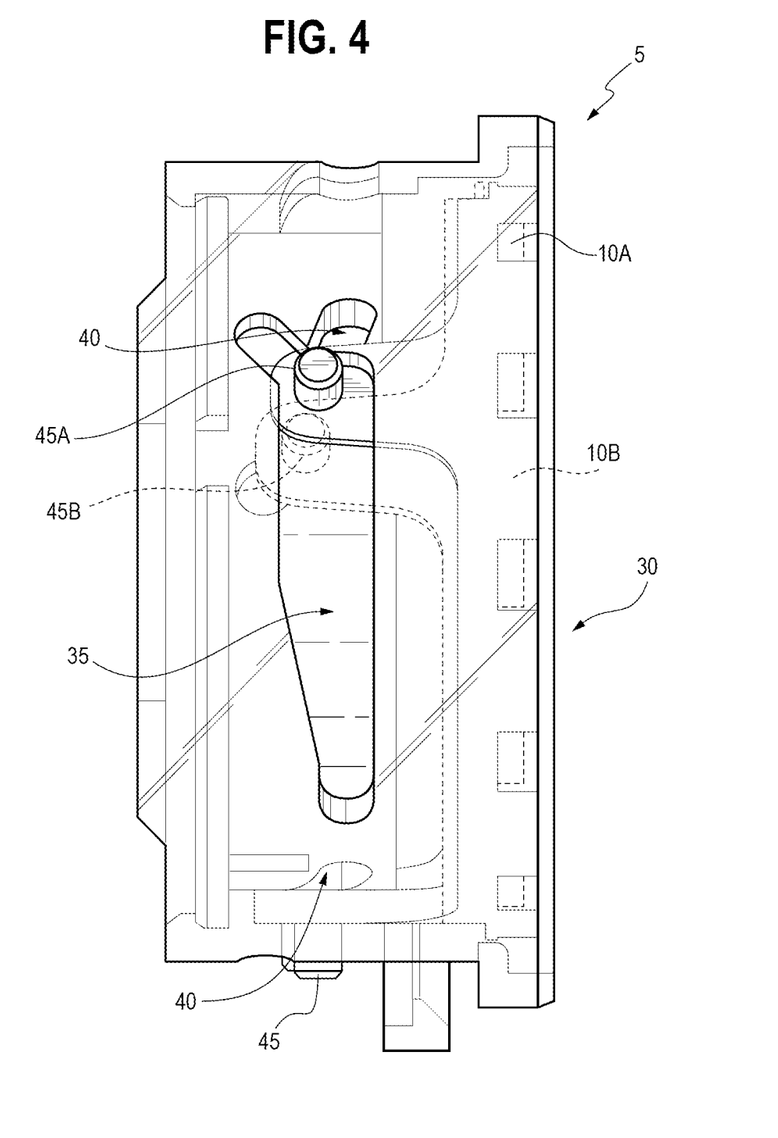
FIG. 4 illustrates the magnetic casting brake of FIGS. 1-3 in a third position.

Turning now to FIG. 4, the dial member and associated curved cam member 35 have been rotated such that the pin members 45 have similarly rotated within the slot members 40 such that the position of the dial member is somewhere between about 20° and 170°. This equates to up to about 0.5 mm of translational movement of the magnets 10. More particularly, in FIG. 4, the pin members 45 (and as a result the magnets 10) are illustrated as transitioning between a first position (denoted by pin member 45A and magnets 10A) and a second position (denoted by pin member 45B and magnets 10B). Because the plate member 15 is associated with the curved cam member 35 and its slots 40, the plate member 15 and thus its magnets 10 are preferably translated toward the proximal side 30 and thus the spool 1. This adjustment preferably takes place such that the plate member 15 and the spool 1 move in the same rotational direction as one another (clockwise in the illustrated embodiment).

In operation in this position, when a cast is made, the plate member 15 and its associated magnets 10 return to the minimum position. As such, when a cast is initiated, the spool 1 may be substantially in free spool. The spool 1 may remain in free spool until the spool 1 reaches a rate of rotation that causes the magnets 10 and the plate member 15 to reach their maximum position on the proximal side 30. When the cast is finished and one begins to retrieve the bait, the plate member 15 and thus the magnets 10 preferably rotate back to the minimum position where they will remain until the next cast is made. As such, the magnets 10 are preferably substantially activated during casting to provide a braking force to the spool 1 to avoid potential backlash.

Figure 5:
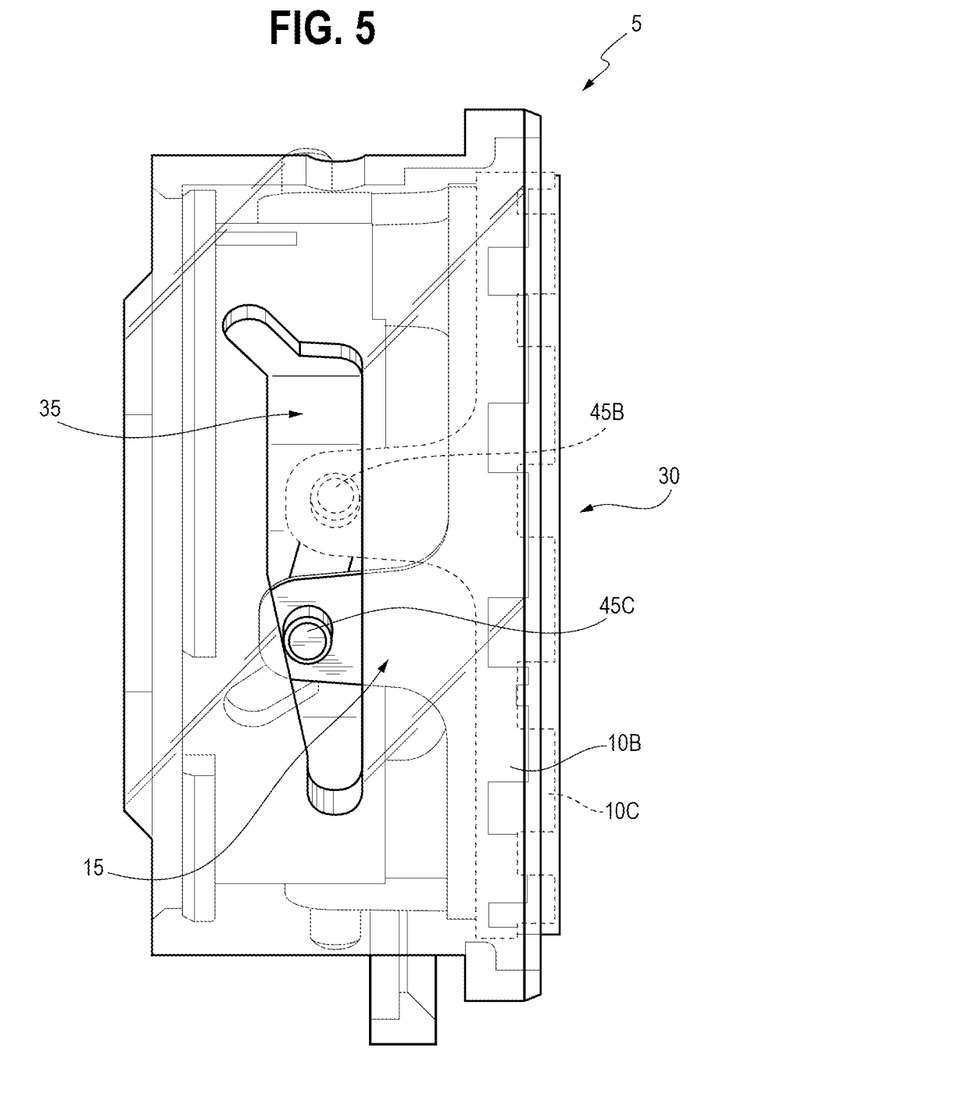
FIG. 5 illustrates the magnetic casting brake of FIGS. 1-4 in a fourth position.

When the dial member (and thus the cam member 35, the pin members 45, and the plate member 15) has been rotated to a position between about 170° and 320°, as illustrated in FIG. 5, the maximum position is set to be as near to the proximal side 30 (and thus the spool 1) as it can be. As the dial member (and thus the cam member 35, the pin members 45, and the plate member 15) is rotated in the 170° and 320° range, the minimum position of the magnets 10 are adjusted. As provided in FIG. 5, the pin members 45 (and as a result the magnets 10) are illustrated as transitioning between a first position (denoted by pin member 45B and magnets 10B) and a second position (denoted by pin member 45C and magnets 10C). In the embodiment illustrated in FIG. 5, the net effect of displacement for the magnets 10 is between about 0.5 mm to 1.5 mm of translational movement towards the proximal side 30.

The minimum position may begin with the magnets 10 all the way drawn in toward the base member 20 such that the spool 1 is in free spool. As the dial member and thus the plate member 15 and the pin members 45 approach 320°, the magnets 10 move toward the proximal side 30 and the spool 1. This adjustment continues until each of the minimum and maximum settings of the plate member 15 and the magnets 10 are the same, namely fully extended toward the proximal side 30 and the spool 1 such that the plate member 15 and associated magnets 10 do not vary in position throughout the casting and reeling process. This position is illustrated in FIG. 6.

While the above-described construction provides for adjustments that take place in three distinct rotational regions (0 to 20°, 20° to 170°, and 170° to 320°), other rotational regions are hereby envisioned. Thus, for example, the total extent of the rotational range of the dial member may vary from 320° to other full ranges, and the ranges by which the casting brake 5 is enabled, or which the minimum or maximum positions may be adjusted, may vary.

In the invention hereof, the magnets 10 are mounted on a curved cam curve and may be retracted from the spool by a spring so that they do not slow the spool down during the beginning of the cast. Since the magnets 10 will move away from the spool when one starts to retrieve, the retrieve process will be lighter and the feel of the lure increased.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A magnetic casting brake for slowing rotation of a spool of a fishing reel, the magnetic casting brake comprising:
a base member;
a plate member that is rotatable within the base member, the plate member including one or more magnets;
wherein the plate member is rotatable relative to a curved cam such that:
in a first range of rotation a minimum position of the one or more magnets is adjusted; and
in a second range of rotation a maximum position of the one or more magnets is adjusted;
wherein a surface of the curved cam includes one or more slot members; and
wherein the plate member includes one or more pin members that project outwardly from the base member.

2. The magnetic casting brake of claim 1, wherein each of the one or more pin members is receivable in each of the one or more slot members.

3. The magnetic casting brake of claim 1, wherein the first range of motion is between about 170° and 320°.

4. The magnetic casting brake of claim 1, wherein the second range of motion is between about 20° and 170°.

5. The magnetic casting brake of claim 1, wherein a third range of motion is provided between about 0° and 20° where the magnetic casting brake is transitioned from an off mode to an active mode.

6. The magnetic casting brake of claim 1, wherein when the one or magnets are nearer the spool, the one or more magnets slow rotation of the spool.

7. The magnetic casting brake of claim 1, wherein the base member includes an elongated opening.

8. A magnetic casting brake for slowing rotation of a spool of a fishing reel, the magnetic casting brake comprising:
a base member;
a plate member that is rotatable within the base member, the plate member including one or more magnets;
wherein the plate member is rotatable relative to a curved cam such that:
in a first range of rotation a minimum position of the one or more magnets is adjusted; and
in a second range of rotation a maximum position of the one or more magnets is adjusted; and
wherein when the plate member is rotated by about 320°, the minimum position of the one or more magnets and the maximum position of the one or more magnets is approximately the same.

9. A magnetic casting brake for slowing rotation of a spool of a fishing reel, the magnetic casting brake comprising:
a base member including at least one elongated opening;
a plate member that is rotatable within the base member, the plate member including:
at least one pin member projecting radially outwardly from the plate member, the at least one pin member being retained in the elongated opening; and
one or more magnets positioned and located at a proximal side of the plate member;
a cam member coupled to the plate member, the cam member including at least one slot member in which the at least one pin member is retained; and
wherein when the cam member is rotated in a first range of rotation a minimum position of the one or more magnets is adjusted; and
wherein when the cam member is rotated in a second range of rotation a maximum position of the one or more magnets is adjusted.

10. The magnetic casting brake of claim 9, wherein the first range of motion is between about 170° and 320°.

11. The magnetic casting brake of claim 9, wherein the second range of motion is between about 20° and 170°.

12. The magnetic casting brake of claim 9, wherein a third range of motion is provided between about 0° and 20° where the magnetic casting brake is transitioned from an off mode to an active mode.

13. The magnetic casting brake of claim 9, wherein when the plate member is rotated by about 320°, the minimum position of the one or more magnets and the maximum position of the one or more magnets is approximately the same.

14. The magnetic casting brake of claim 9, when the magnetic casting brake is in an off position, the at least one pin member is retained in a first end portion of the elongated opening.

15. The magnetic casting brake of claim 9, wherein when the magnetic casting brake is in an absolute maximum and minimum position, the at least one pin member of the plate member is retained within a second end portion of the base member.

16. The magnetic casting brake of claim 9, wherein in the plate member includes two pin members.

17. The magnetic casting brake of claim 9, wherein the cam member includes two slot members.

18. The magnetic casting brake of claim 9, wherein the base member includes two elongated openings.

* * * * *